Oct. 20, 1925.

L. SOMMER

WATER PAN ALARM

Filed Oct. 24, 1924

1,558,057

INVENTOR.
L. Sommer.
BY E. J. Fetherstonhaugh.
ATTORNEY.

Patented Oct. 20, 1925.

1,558,057

UNITED STATES PATENT OFFICE.

LEO SOMMER, OF ST. LIN, QUEBEC, CANADA.

WATER-PAN ALARM.

Application filed October 24, 1924. Serial No. 745,664.

*To all whom it may concern:*

Be it known that I, LEO SOMMER, a subject of the King of Great Britain, and residing at St. Lin, in the Province of Quebec, in the Dominion of Canada, have invented a new and useful Water-Pan Alarm, of which the following is the specification.

The invention relates to a water pan alarm as described in the present specification and illustrated in the accompanying drawings that form part of the same.

The invention consists essentially of the novel features of construction pointed out broadly and specifically in the claims for novelty following a description containing an explanation in detail of an acceptable form of the invention.

The objects of the invention are to avoid flooding in households from the neglect of attention to the pan under a refrigerator; to enable the housewife to attend to her multitudinous duties without feeling the constant responsibility of emptying the refrigerator pan until it is actually full; to warn as well as signal the alarm; to furnish a mechanism cheap to construct and efficient in its operation, and generally to provide a durable and serviceable device for the purposes aforesaid.

In the drawings, Figure 1 is a vertical sectional view of a water pan showing the complete device applied thereto.

Like numerals of reference indicate corresponding parts in the various figures.

Figure 1:
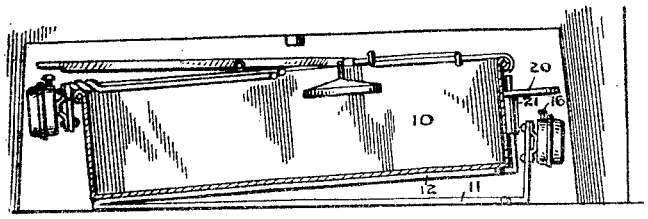
Figure 2:
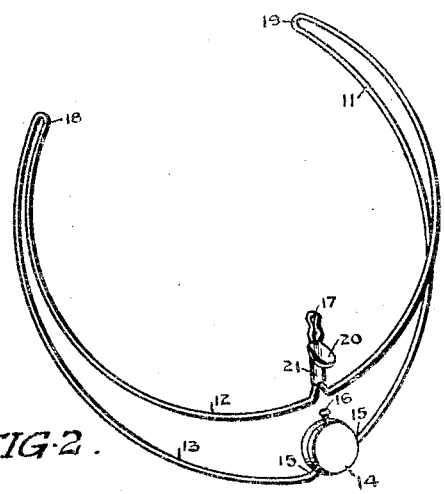
Figure 2 is a perspective detail of the mechanism of the warning signal.
Figure 3:
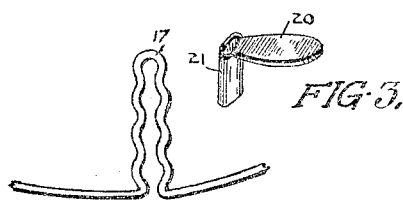
Figure 3 is an enlarged perspective detail of the adjustable contact finger in the warning signal mechanism.
Figure 4:
Figure 4 is a fragmentary detail showing the finger mounting.

Referring to the drawings, the water pan 10 is of the customary shape, that is to say, comparatively shallow and open at the top and may be round or square as found most convenient.

The pan rest 11 is in the form of a spring in substantially horseshoe shape and may be made of the closed double loops of wire 12 and 13 having the bell 14 connecting the ends 15 of the wire which are bent accordingly. The button 16 of the bell 14 is shown on the upper side of said bell in vertical alignment with crinkled finger mounting 17 bent upwardly in loop form from the centre of the pan rest loop 12 and above the joined ends of the pan rest base loop 13.

The horseshoe loops 12 and 13 are closed at the ends 18 and 19 and the loop 12 naturally forms a spring rest for the pan 10. The finger 20 extending from the sleeve 21 engages the button 16 on being brought down by the weight of the water in the pan 10 and for this purpose the sleeve 21 is adjustable on the crinkled finger loop 17, in order that the said finger on the loop may be adjusted to the correct position to sound a warning when the pan is three quarters full.

This alarm is for giving full warning to the housewife when the pan is about three quarters full thereby giving ample time for the opportunity of emptying the water therefrom before the overflow.

What I claim is:—

1. In a water pan alarm, a pair of horseshoe loops formed of a single length of wire and comprising a spring pan rest operating over a spring base, said pan rest having a minor finger loop, a finger adjustably secured on said finger loop, and a bell having a press button in operative relationship to said finger.

2. In a water pan alarm, a double horseshoe wire loop forming base and pan rest loops, the latter having a minor finger loop a finger projecting from a sleeve adjustably mounted on said finger loop, said loops being formed in a continuous length of wire, and a bell secured to ends of said base loop and having a press button adapted to be engaged by said finger, said horseshoe loops being joined at the extremities of the horseshoe.

Signed at Montreal, Canada this 21st day of October 1924.

LEO SOMMER.